(12) United States Patent
Ganesan et al.

(10) Patent No.: US 7,340,585 B1
(45) Date of Patent: Mar. 4, 2008

(54) METHOD AND SYSTEM FOR FAST LINKED PROCESSOR IN A SYSTEM ON A CHIP (SOC)

(75) Inventors: Satish R. Ganesan, Mountain View, CA (US); Goran Bilski, San Jose, CA (US); Usha Prabhu, Los Gatos, CA (US); Ralph D. Wittig, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 336 days.

(21) Appl. No.: 10/229,543

(22) Filed: Aug. 27, 2002

(51) Int. Cl.
*G06F 15/17* (2006.01)
*G06F 15/80* (2006.01)

(52) U.S. Cl. .......................... 712/15; 712/36
(58) Field of Classification Search ................ 712/15, 712/35, 36, 227; 716/16, 17; 326/39; 714/725
See application file for complete search history.

(56) References Cited

U.S. PATENT DOCUMENTS

| | | | | |
|---|---|---|---|---|
| 4,943,909 A | * | 7/1990 | Huang | 712/15 |
| 4,949,909 A | * | 8/1990 | Hatfield | 242/557 |
| 6,141,327 A | * | 10/2000 | Kalkunte et al. | 370/252 |
| 6,181,159 B1 | * | 1/2001 | Rangasayee | 326/39 |
| 6,215,327 B1 | * | 4/2001 | Lyke | 326/41 |
| 6,418,494 B1 | * | 7/2002 | Shatas et al. | 710/305 |
| 6,484,280 B1 | * | 11/2002 | Moberly | 714/726 |
| 6,678,645 B1 | * | 1/2004 | Rajsuman et al. | 703/20 |
| 6,700,404 B1 | * | 3/2004 | Feng et al. | 326/41 |
| 2002/0095649 A1 | * | 7/2002 | Sample et al. | 716/12 |
| 2002/0124007 A1 | * | 9/2002 | Zhao | 707/102 |
| 2003/0217306 A1 | * | 11/2003 | Harthcock et al. | 714/30 |

\* cited by examiner

*Primary Examiner*—Daniel H. Pan
(74) *Attorney, Agent, or Firm*—John J. King

(57) ABSTRACT

A fast linked multiprocessor network (22) including a plurality of processing modules (24, 26, 28, 30, 32, and 34) implemented on a field programmable gate array (10) and a plurality of configurable uni-directional links (21, 23, 25, 27, 29, 31) coupled among at least two of the plurality processing modules providing a streaming communication channel between at least two of the plurality of processing modules.

19 Claims, 3 Drawing Sheets

METHOD AND SYSTEM FOR FAST LINKED PROCESSOR IN A SYSTEM ON A CHIP (SOC)

FIELD OF THE INVENTION

This invention relates generally to programmable logic devices, and more particularly to a method and system for providing fast link connections among modules in a FPGA-based SoCs.

BACKGROUND OF THE INVENTION

Programmable devices are a class of general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays (PISA).

As chip capacity continues to increase significantly, the use of field programmable gate arrays (FPGAs) is quickly replacing the use of application specific integrated circuits (ASICs). An ASIC is a specialized integrated circuit that is designed for a particular application and can be implemented as a specialized microprocessor. Notably, a FPGA is a programmable logic device (PLD) that has an extremely high density of electronic gates as compared to an ASIC. This high gate density has contributed immensely to the popularity of FPGAs. Notably, FPGAs can be designed using a variety of architectures that can include user configurable input/output blocks (IOBs), and programmable logic blocks having configurable interconnects and switching capability.

The advancement of computer chip technology has also resulted in the development of embedded processors and controllers. An embedded processor or controller can be a microprocessor or microcontroller circuitry that has been integrated into an electronic device as opposed to being built as a standalone module or "plugin card." Advancement of FPGA technology has led to the development of FPGA-based system-on-chips (SoC) including FPGA-based embedded processor SoCs. A SoC is a fully functional product having its electronic circuitry contained on a single chip. While a microprocessor chip requires ancillary hardware electronic components to process instructions, a SoC would include all required ancillary electronics. For example, a SoC for a cellular telephone can include a microprocessor, encoder, decoder, digital signal processor (DSP), RAM and ROM. It should be understood within contemplation of the present invention that an FPGA-Based SoC does not necessarily include a microprocessor or microcontroller. For example, a SoC for a cellular telephone could include an encoder, decoder, digital signal processor (DSP), RAM and ROM that rely on an external microprocessor. A SoC could also include multiple processing modules coupled to each other via a bus or several busses. It should also be understood herein that "FPGA-based embedded processor SoCs" are a specific subset of FPGA-based SoCs that would include their own processors.

In order for device manufacturers to develop FPGA-based SoCs or FPGA-based embedded processor SoCs, it is necessary for them to acquire intellectual property rights for system components and/or related technologies that are utilized to create the FPGA-based SoCs. These system components and/or technologies are called cores or Intellectual Property (IP) cores. An electronic file containing system component information can typically be used to represent the core. A device manufacturer will generally acquire several cores that are integrated to fabricate the SoC. More generically, the IP cores can form one or more of the processing modules in an FPGA-based SoCs. The processing modules can either be hardware or software based.

Notwithstanding advantages provided by using FPGA-based SoCs, the development of these SoCs can be very challenging. One of the challenges includes communication among multiple hardware and software processors embedded in a FPGA-based SoC. Typically, such communication occurs over a bus. Unfortunately, communication over a bus involves a large amount of overhead due to bus arbitration times. Therefore, several clock cycles are typically needed for simple communication among processing modules. Furthermore, the actual links among the processing modules are not flexible in terms of defining or customizing data sizes and FIFO sizes. Also, many links among processor are processor type dependent. FPGA based embedded processor SoCs are being introduced into the market, but there are no solutions which allow users to customize the system, the hardware and software processing modules, the links among the processing modules, and the associated software nor is there a system enabling a user to tradeoff a function which is implemented in hardware (FPGA fabric) or software (running on the embedded processor). It would be desirable to have a method and system for enabling fast linked processing modules with programmable links independent of processing module type in FPGA-based SoCs and that further overcome the shortcomings described above.

SUMMARY OF THE INVENTION

In a first aspect of the present invention, a fast linked multiprocessor network comprises plurality of processing modules implemented on a field programmable gate array and a plurality of configurable uni-directional links coupled among at least two of the plurality processing modules providing a streaming communication channel between at least two of the plurality of processing modules.

The plurality of uni-directional links can be formed from a first-in-first-out (FIFO) streaming communication network and can also be ideally formed using the reconfigurable fabric of the field programmable gate array to enable uni-directional links that are configurable in terms of depth in buffer (FIFO) size and width in bit size. The processing modules can be software or hardware processor types and could serve as digital signal processors or network processor cores for example. The fast linked multiprocessor network can also comprise a plurality of uni-directional links for providing a streaming communication channel between at least one of the plurality of processing modules and a System on Chip communication bus.

In accordance with a second aspect of the present invention, an interface for integrating processing modules in an FPGA-based SoC comprises a plurality of configurable uni-directional serial links coupled to a plurality of input ports of a processing module where a first portion of the plurality of configurable uni-directional serial links are from at least another processing module and a second portion of the configurable plurality of uni-directional serial links are from a bus connection.

The interface further comprises a plurality of configurable uni-directional serial links coupled to a plurality of output ports of the processing module, where a first portion of the plurality of configurable uni-direction serial links are coupling to at least another processing module and a second portion of the plurality of configurable uni-directional serial links are coupling to a bus connection.

DETAILED DESCRIPTION OF THE DRAWINGS

Figure 1:
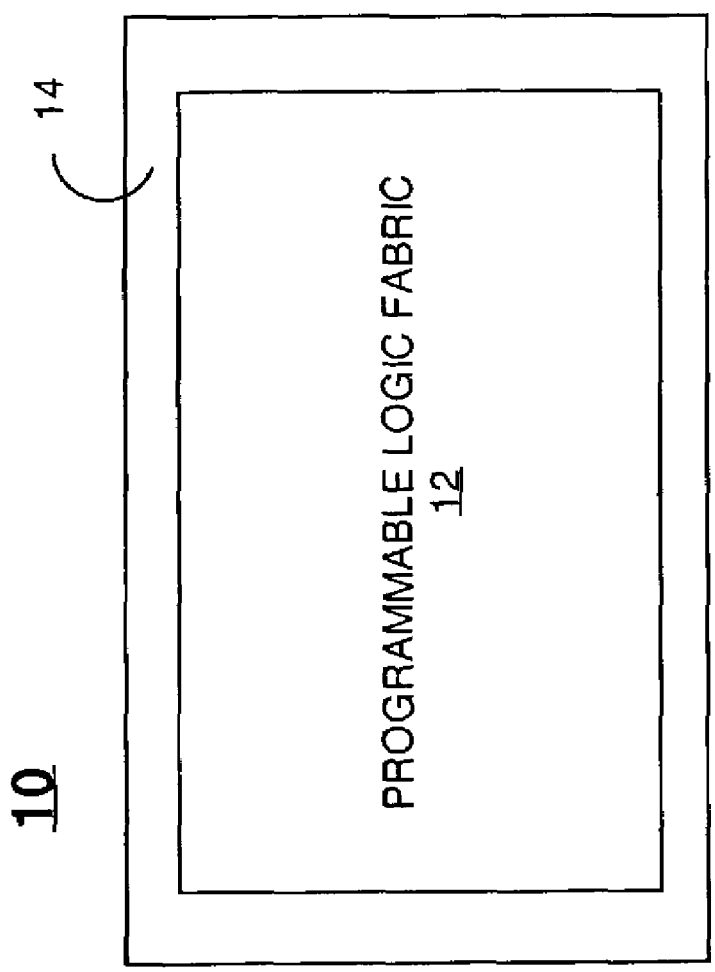
FIG. 1 illustrates a schematic block diagram of a prior art field programmable gate array.

Field programmable gate arrays (FPGA) have become very popular for telecommunication applications, Internet applications, switching applications, routing applications, and a variety of other end user applications. FIG. 1 illustrates a generic schematic block diagram of a field programmable gate array (FPGA) 10. The FPGA 10 includes programmable logic fabric 12 (containing programmable logic gates and programmable interconnects) and programmable input/output blocks 14. The programmable input/output blocks 14 are fabricated on a substrate supporting the FPGA 10 and are coupled to the pins of the integrated circuit, allowing users to access the programmable logic fabric 12. The programmable logic fabric 12 may be programmed to perform a wide variety of functions corresponding to particular end user applications and may be implemented in a variety of ways.

A fast simplex link (FSL) or programmable uni-directional link among processing modules can be implemented using the reconfigurable programmability of the FPGA and the FPGA fabric by allowing different data sizes and FIFO sizes or buffer sizes while still enabling a single clock delay between processing modules for communication. This programmability of the links allows greater flexibility during implementation. The FSL can be used as the communication interface between any two processing modules independent of processing module types (hardware or software). The FSLs also support additional flags, like full, empty, half-full etc. that may be used by the modules connected to the FSL. The processing module independence and the programmability greatly simplifies design paradigms like Co-design, or Multi-processing by standardizing the interface mechanism across hardware and software processors.

Figure 2:
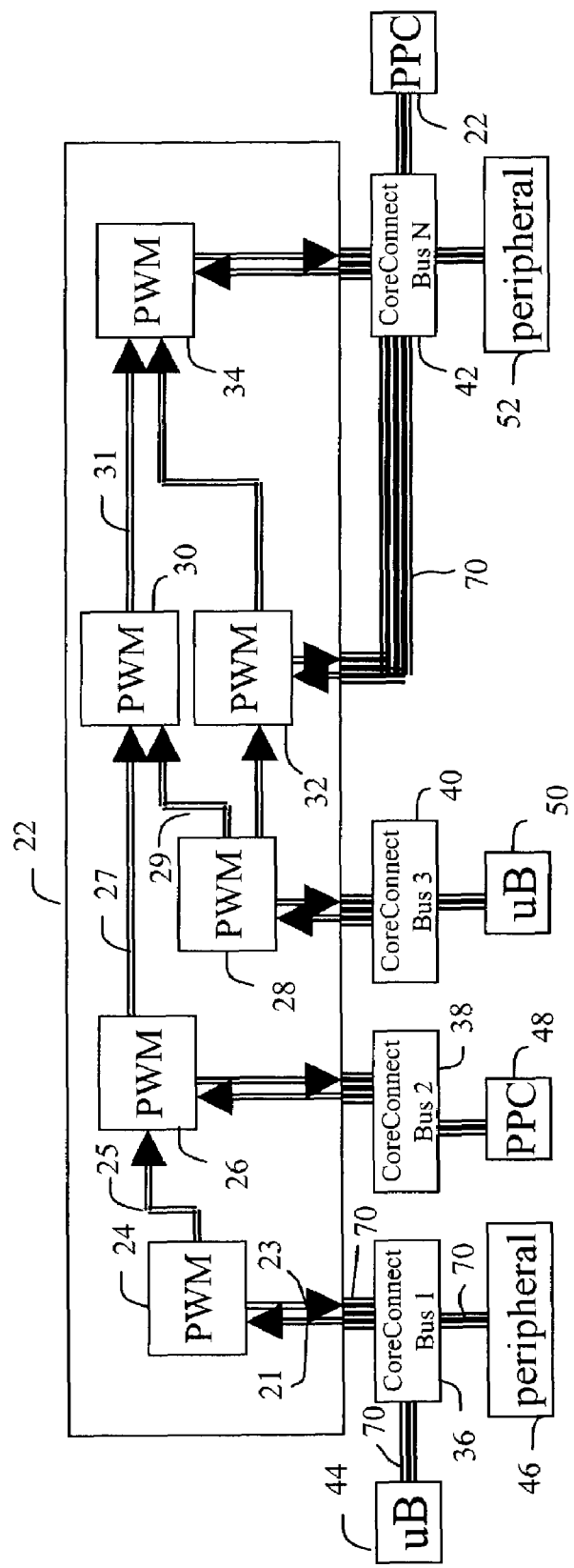
FIG. 2 depicts an exemplary block diagram of a System on Chip utilizing configurable uni-directional links in accordance with the inventive arrangements.

Referring to FIG. 2, a fast linked multiprocessor network 22 preferably comprises a plurality of processing modules (24, 26, 28, 30, 32, and 34) implemented on a field programmable gate array and a plurality of configurable uni-directional links (21, 23, 25, 27, 29, 31) such as fast simplex links coupled among at least two of the plurality processing modules providing a streaming communication channel between at least two of the plurality of processing modules. The plurality of uni-directional links can be formed from a first-in-first-out (FIFO) streaming communication network and can also be ideally formed using the reconfigurable fabric of the field programmable gate array to enable uni-directional links that are configurable in terms of depth in buffer (FIFO) size and width in bit size. The processing modules can be software or hardware processor types and could serve as digital signal processors or network processor cores for example. The fast linked multiprocessor network can also comprise a plurality of uni-directional links for providing a streaming communication channel between at least one of the plurality of processing modules and a System on Chip communication bus such as IBM's CoreConnect bus.

Figure 3:
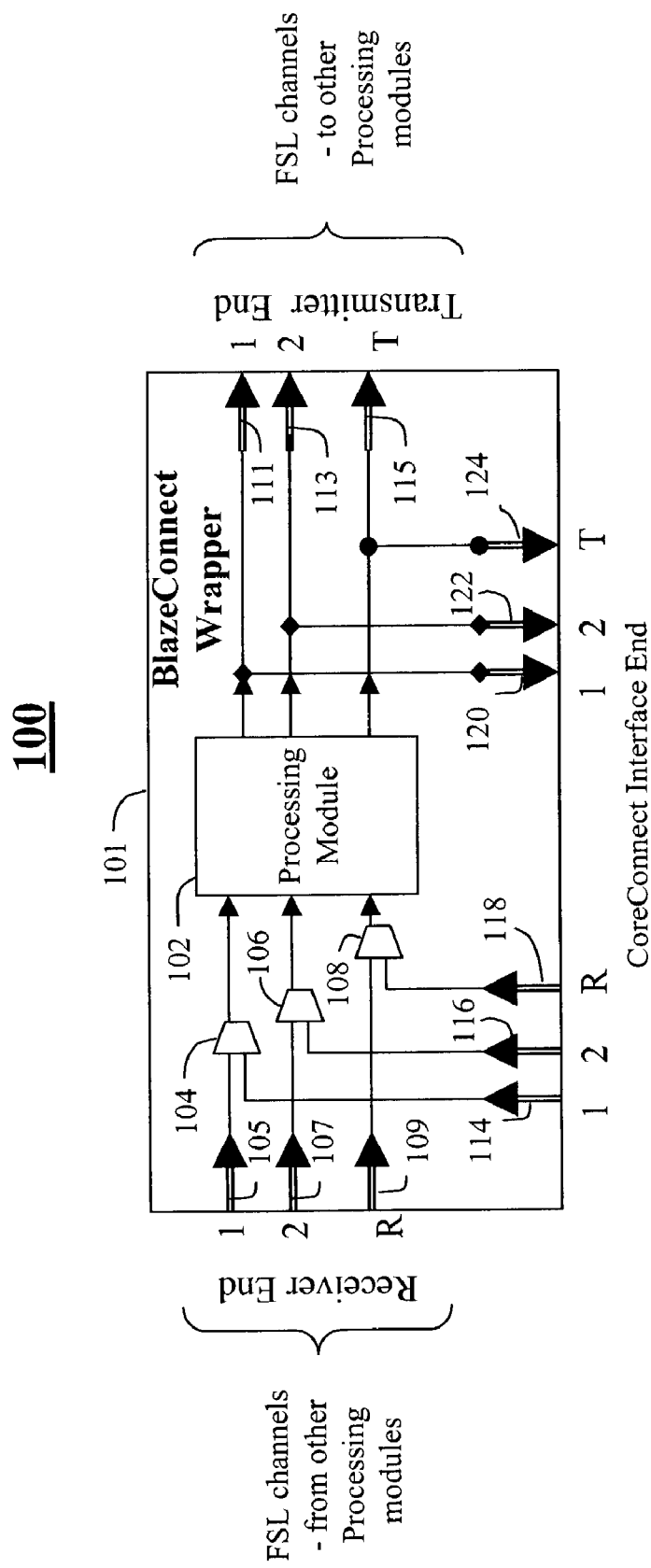
FIG. 3 depicts a block diagram of a processing module interface in accordance with the invention.

Referring to FIGS. 2 and 3, the system architecture in accordance with the present invention comprises a central programmable connection matrix 22 or 100 and a set of one or more peripherals connected to it. FIG. 3 illustrates a programmable connection matrix 100 and in further detail a processing module interface or wrapper 101 used to connect one processing module such as processing module 102 to another processing module or one processing module to a bus. In the embodiment of FIG. 2, the matrix 22 can comprise of two types of communication channels. The first communication channel type is a dedicated Fast Simplex Link (FSL) that enables a fast dedicated communication channel between any two processing modules. For example, FSLs 25, 27, 29 and 31 respectively link processing modules 24 & 26, 26 & 30, 28 & 30, and 30 & 34. The FSL allows a processing module to transmit data in one clock cycle and the connected processing module to receive data in the following clock cycle. The FSL channel is uni-directional and dedicated and implements a Data Flow Channel between the connected modules. (Note that this Data Flow channel allows pipelining across serially connected processing modules). The FSL is also used to send control signals to the processing modules.

The second communication channel type is an FSL Interface channel that enables communication between a processing module and other modules/peripherals through other buses, like the IBM's CoreConnect Bus Architecture including the Processor Local Bus (PLB), On-Chip Peripheral Bus (OPB), or Device Control Register (DCR) for example. The CoreConnect Bus is a fully arbitrated bus shared amongst multiple peripherals. In FIG. 2, for example, CoreConnect bus (1) 36 enables communication between processing module 24 and peripherals 44 and 46, CoreConnect bus (2) 38 enables communication between processing module 26 and peripheral 48, CoreConnect bus (3) 40 enables communication between processing module 28 and peripheral 50, and CoreConnect bus (N) 42 enables communication between processing modules 32 and 34 and peripherals 22 and 52. All processing modules may be configured as slaves or masters on the bus. This allows processors like the IBM PowerPC (22 or 48) or Xilinx's MicroBlaze (44 or 50) that may be masters on the CoreConnect bus, to communicate with the processing modules (24, 26, 28, 30, 32, and 34). This also allows processing modules configured as masters to access any other slave peripherals connected to the CoreConnect bus.

Each of the processing modules in FIG. 2 (24, 26, 28, 30, 32, and 34) preferably uses a programmable connection matrix wrapper 101 as shown in FIG. 3 to connect to other processing modules and to buses. An interface for integrating processing modules in an FPGA-based SoC as shown in FIG. 3 comprises a plurality of configurable uni-directional serial links coupled to a plurality of input ports of a processing module where a first portion of the plurality of configurable uni-directional serial links are from at least another processing module and a second portion of the configurable plurality of uni-directional serial links are from a bus connection. The interface further comprises a plurality of configurable uni-directional serial links coupled to a plurality of output ports of the processing module, where a first portion of the plurality of configurable uni-direction serial links are coupling to at least another processing module and a second portion of the plurality of configurable uni-directional serial links are coupling to a bus connection.

Ideally, the uni-directional links are formed from a first-in-first-out streaming communication network using the reconfigurable fabric of the field programmable gate array and are configurable in terms of depth in buffer size and width in bit size. Communication between the processing module and another processing module can occur in a single clock cycle. The plurality of configurable uni-directional links provides a streaming communication channel between at least the processing module and another processing module or between the processing module and a communication bus. A plurality of multiplexers selectively connects the first portion and the second portion of the plurality of configurable uni-directional simplex links to the plurality of input ports of the processing module.

Ideally, only processing modules having the matrix wrapper 101 can use the FSL channel for communication to other processing modules. The matrix wrapper 101 can comprise [0:R] dedicated FSL channels using inbound FSL links 105, 107 and 109 on the receiving side of a processing module 102, and [0:T] dedicated FSL channels using outbound FSL links 11, 113, and 115 on the transmitting side of the processing module 102. The matrix wrapper 101 can further provide communication between a processing module and any other peripheral (having a matrix wrapper or not) through the CoreConnect bus (or other bus) using [0:R] FSL input interface channels to the CoreConnect bus using inbound FSL links 114, 116, and 118 or [0:T] FSL output interface channels to the CoreConnect bus using outbound FSL links 111, 113, and 115. The FSL links may interface to the CoreConnect bus using the IPIF (IP interface) 70 shown in FIG. 2. The IPIF currently supports communication either with the OPB bus or the PLB bus. The processing module 102 by itself preferably consists of [0:R] input data streams and [0:T] output data streams. The module's input data streams may be selectively connected using switches or multiplexers 104, 106 and 108 to either the receiver FSL channels or through the receiver FSL interface to the CoreConnect bus. Similarly, the module's output data streams may be connected either to the transmitter FSL channels or to the transmitter FSL interface to the CoreConnect bus.

One of the advantages of a system built in accordance with the present invention is the ability of a bus master (PPC or MicroBlaze, for example) to perform useful computation in parallel while multiple processing modules communicating through FSL channels are active. Also, several FSL chains can perform computation in parallel along with the bus masters. Additionally, by providing the flexibility to use CoreConnect as a communication channel, the present invention offers all the advantages of a system built purely with a CoreConnect bus. Also, the availability of the CoreConnect bus allows easy integration of sub-systems built using just the CoreConnect bus, along with sub-systems built using the present invention. The matrix wrapper enables processing modules to connect to one or more FSL channels and the CoreConnect bus. This model simplifies co-design by enabling implementation of modules in software or hardware by the turn of a switch. The FSL channel implements a dedicated data flow channel, thereby providing a "single clock delay" communication between any two data-dependent processing modules. Without the FSL communication channel, the data has to be communicated using the CoreConnect bus or other bus that consumes several clock cycles.

The code necessary for implementing the design of the FPGA-based SoC can be in a format such as the well known hardware description language (HDL) (NOTE: SoC designs are coded in C. The Hardware is represented in HDL and the software portion in C). HDL is a language used to describe the functions of an electronic circuit for documentation, simulation and/or logic synthesis. Verilog and VHSIC Hardware Description Language (VHDL) are standardized HDLs which are well known by those skilled in the art. Verilog and VHDL can be used to design electronic systems at the component, board and system level. They can facilitate the development of models at a very high level of abstraction. Other formats now known or to be discovered can also be used to represent the system model.

In light of the foregoing description of the invention, it should be recognized that the present invention can be realized in hardware, software, or a combination of hardware and software. A method and system for a fast linked processor network in an FPGA-based SoC according to the present invention can be realized in a centralized fashion in one computer system, or in a distributed fashion where different elements are spread across several interconnected processing modules. A typical combination of hardware and software could be a general purpose computer system with a computer program that, when being loaded and executed, controls the computer system such that it carries out the invention described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

The invention claimed is:

1. A fast linked multiprocessor network in an integrated circuit, comprising:
  a plurality of processing modules implemented on a field programmable gate array;
  a plurality of configurable uni-directional links coupled by way of a plurality of switches between a pair of processing modules comprising a first processing module and a second processing module, said plurality of said configurable uni-directional links providing a streaming communication channel between the pair of processing modules;
  a plurality of second configurable uni-directional links from the outputs of said second processing module of said pair of processing modules and coupled to a bus;
  a plurality of third configurable uni-directional links from said bus to the plurality of switches, wherein the plurality of switches enables the connection from one of the outputs of the first processing module by way of the plurality of configuration uni-directional links or the bus by way of the plurality of third configuration uni-directional links to the second processing module; and a processor coupled to the bus, the processor communicating with the second processing module of the pair of processing modules and enabling a computation in parallel with the streaming communication channel between the pair of processing modules by way of the plurality of second configurable uni-directional links.

2. The fast linked multiprocessor network of claim 1, wherein the plurality of configurable uni-direction links are formed from fast simplex links between at least two of the plurality of processing modules.

3. The fast linked multiprocessor network of claim 1, wherein the plurality of uni-directional links are formed from a first-in-first-out streaming communication network.

4. The fast linked multiprocessor network of claim 3, wherein the plurality of uni-directional links are formed using a reconfigurable fabric of the field programmable gate array.

5. The fast linked multiprocessor network of claim 1, wherein the configurable plurality of uni-direction links are configurable in terms of depth in buffer size and width in bit size.

6. The fast linked multiprocessor network of claim 1, wherein the plurality of processing module are processing modules selected from the group comprising hardware processors, software processors, digital signal processors, or network processor cores.

7. The fasted link multiprocessor network of claim 1, wherein communication between any connected processing modules among the plurality of processing modules occurs in a single clock cycle.

8. The fast linked multiprocessor network of claim 1, wherein the at least one processing module is a hardware processor type and at least one processing module is a software processor type among the plurality of processing modules.

9. The fast linked multiprocessor network of claim 1, wherein among the plurality of processing modules at least one processing module is a hardware processor type and another processing module is a hardware processor type.

10. The fast linked multiprocessor network of claim 1, wherein among the plurality of processing modules at least one processing module is a software processor type and another processing module is a software processor type.

11. The fast linked multiprocessor network of claim 1, wherein the fast link multiprocessor network further comprises a plurality of uni-directional links for providing a streaming communication channel between at least one of the plurality of processing modules and a system on chip communication bus.

12. An interface for integrating processing modules in an FPGA-based SoC, the interface comprising:

a plurality of configurable uni-directional serial links coupled to a plurality of input ports of a first processing module, wherein the plurality of configurable uni-direction serial links are coupled to receive data from at least a second processing module and a plurality of second configurable uni-directional serial links, coupled to receive data from a bus connection of a bus, by way of a plurality of switches, wherein the plurality of switches enables the connection to one of the outputs of the second processing module by way of the plurality of configurable uni-directional serial links or the bus by way of the plurality of second configurable uni-directional serial links;

a plurality of third configurable uni-directional serial links coupled to a plurality of output ports of the first processing module, wherein the plurality of third configurable uni-direction serial links are coupled to at least a third processing module and a plurality of fourth configurable uni-directional serial links coupled between the outputs of the second processing module and a second bus connection of the bus; and a processor coupled to the bus, said processor communicating with the first processing module and enabling a computation in parallel with a communication channel between the first processing module and the second processing module by way of the plurality of fourth configurable uni-directional serial links.

13. The interface of claim 12, wherein the plurality of configurable uni-directional links are formed from a first-in-first-out streaming communication network.

14. The interface of claim 12, wherein the plurality of uni-directional links are formed using a reconfigurable fabric of the field programmable gate array.

15. The interface of claim 12, wherein the configurable plurality of uni-direction links are configurable in terms of depth in buffer size and width in bit size.

16. The interface of claim 12, wherein communication between the first processing module and the second processing module occurs in a single clock cycle.

17. The interface of claim 12, wherein the first processing module is selected among a hardware processor type and a software processor type.

18. The interface of claim 12, wherein the plurality of first or third configurable uni-directional links provides a streaming communication channel between at least the second processing module and the first processing module or between the first processing module and communication bus.

19. The interface of claim 12, wherein the plurality of switches comprises a plurality of multiplexers which selectively connects a first portion and a second portion of the plurality of configurable uni-directional serial links to the plurality of input ports of the first processing module.

* * * * *